(12) United States Patent
Mo

(10) Patent No.: US 12,194,900 B2
(45) Date of Patent: Jan. 14, 2025

(54) CHILD SAFETY SEAT

(71) Applicant: BAMBINO PREZIOSO SWITZERLAND AG, Steinhausen (CH)

(72) Inventor: Xiao Long Mo, Guangdong (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/479,959

(22) Filed: Oct. 3, 2023

(65) Prior Publication Data
US 2024/0025312 A1 Jan. 25, 2024

Related U.S. Application Data

(63) Continuation of application No. 17/566,124, filed on Dec. 30, 2021, now Pat. No. 11,970,095.

(30) Foreign Application Priority Data

Dec. 31, 2020 (CN) .......................... 202023332915.2

(51) Int. Cl.
*B60N 2/28* (2006.01)
*B60N 2/42* (2006.01)

(52) U.S. Cl.
CPC .......... *B60N 2/2851* (2013.01); *B60N 2/286* (2013.01); *B60N 2/2869* (2013.01);
(Continued)

(58) Field of Classification Search
CPC .... B60N 2/286; B60N 2/2869; B60N 2/2872; B60N 2/2881; B60N 2/2884; B60N 2/2887; B60N 2/4235
(Continued)

(56) References Cited

U.S. PATENT DOCUMENTS

| 2004/0164529 A1 | 8/2004 | Yoshida |
| 2011/0062756 A1 | 3/2011 | Campbell et al. |
| 2015/0091344 A1 | 4/2015 | Tanner et al. |

FOREIGN PATENT DOCUMENTS

| CN | 204605583 U | 9/2015 |
| CN | 108237954 A | 7/2018 |

(Continued)

OTHER PUBLICATIONS

Taiwanese Office Action issued in corresponding Taiwanese Patent Application No. 110149308, dated Dec. 2, 2022, pp. 1-12.
(Continued)

*Primary Examiner* — Anthony D Barfield
(74) *Attorney, Agent, or Firm* — HAUPTMAN HAM, LLP

(57) ABSTRACT

A child safety seat includes a seat shell and a side protection part. The seat shell has a seat portion, a backrest portion and a sidewall, the sidewall protruding forward from the backrest portion and having a front edge. The side protection part is disposed adjacent to the sidewall at an inner side thereof and extends along the inner side of the sidewall from a location adjacent to the seat portion toward a top of the backrest portion, wherein the side protection part has a first and a second major surface opposite to each other, and an edge portion connected with the first and second major surface, the edge portion having a rib that protrudes from the second major surface and lies adjacent to the front edge of the sidewall of the seat shell.

19 Claims, 3 Drawing Sheets

(52) U.S. Cl.
CPC ......... B60N 2/2872 (2013.01); B60N 2/2881 (2013.01); B60N 2/2884 (2013.01); B60N 2/2887 (2013.01); B60N 2/4235 (2013.01); B60N 2002/2896 (2013.01)

(58) Field of Classification Search
USPC .................................................... 297/216.11
See application file for complete search history.

(56) References Cited

FOREIGN PATENT DOCUMENTS

| | | |
|---|---|---|
| DE | 102016101616 A1 | 8/2016 |
| EP | 1486384 A2 | 12/2004 |
| EP | 2679439 A1 | 1/2014 |

OTHER PUBLICATIONS

German Office Action issued in corresponding German Patent Application No. 102021006357.0, dated Jun. 14, 2023, pp. 1-7.

CHILD SAFETY SEAT

CROSS-REFERENCE TO RELATED APPLICATION(S)

This application is a continuation application of U.S. patent application Ser. No. 17/566,124 filed on Dec. 30, 2021, now U.S. Pat. No. 11,970,095 which claims priority to China patent application no. 202023332915.2 filed on Dec. 31, 2020.

BACKGROUND

1. Field of the Invention

The present invention relates to child safety seats.

2. Description of the Related Art

A child safety seat is generally used in a vehicle to provide protection and reduce the impact of accidental collision on a child. For example, when a frontal collision occurs, the child safety seat can effectively prevent the child's body from abruptly moving forward which may result in harmful hitting impact. When a rearward collision occurs, a backrest portion and a headrest of the child safety seat can support the body and the head of the child, which can prevent abrupt rearward movement of the child's neck that would result in neck injuries. Child safety seats thus can reduce the risk of injuries and improve the safety of children in a vehicle.

However, when the vehicle is subjected to sideways collision, the conventional child safety seats can only rely on the sidewalls of the backrest portion and the sidewalls of the headrest to reduce the impact of the collision, which does not provide sufficient protection.

Therefore, there is a need for an improved child safety seat that can provide better cushioning against sideways collision.

SUMMARY

The present application describes a child safety seat that can offer better protection and address at least the foregoing issue.

According to an aspect, a child safety seat includes a seat shell and a side protection part. The seat shell has a seat portion, a backrest portion and a sidewall, the sidewall protruding forward from the backrest portion and having a front edge. The side protection part is disposed adjacent to the sidewall at an inner side thereof and extends along the inner side of the sidewall from a location adjacent to the seat portion toward a top of the backrest portion, wherein the side protection part has a first and a second major surface opposite to each other, and an edge portion connected with the first and second major surface, the edge portion having a rib that protrudes from the second major surface and lies adjacent to the front edge of the sidewall of the seat shell.

According to another aspect, a child safety seat described herein includes a seat shell and a side protection part. The seat shell has a seat portion, a backrest portion and a sidewall, the sidewall protruding forward from the backrest portion. The side protection part is disposed adjacent to the sidewall at an inner side thereof and extends along the inner side of the sidewall from a location adjacent to the seat portion toward a top of the backrest portion, wherein the side protection part has one or more cushioning structure, and a first and a second major surface opposite to each other, the first major surface facing an inner space of the seat shell where is received a child and covering the one or more cushioning structure, and the second major surface facing the sidewall of the seat shell.

DETAILED DESCRIPTION OF THE EMBODIMENTS

Figure 1:
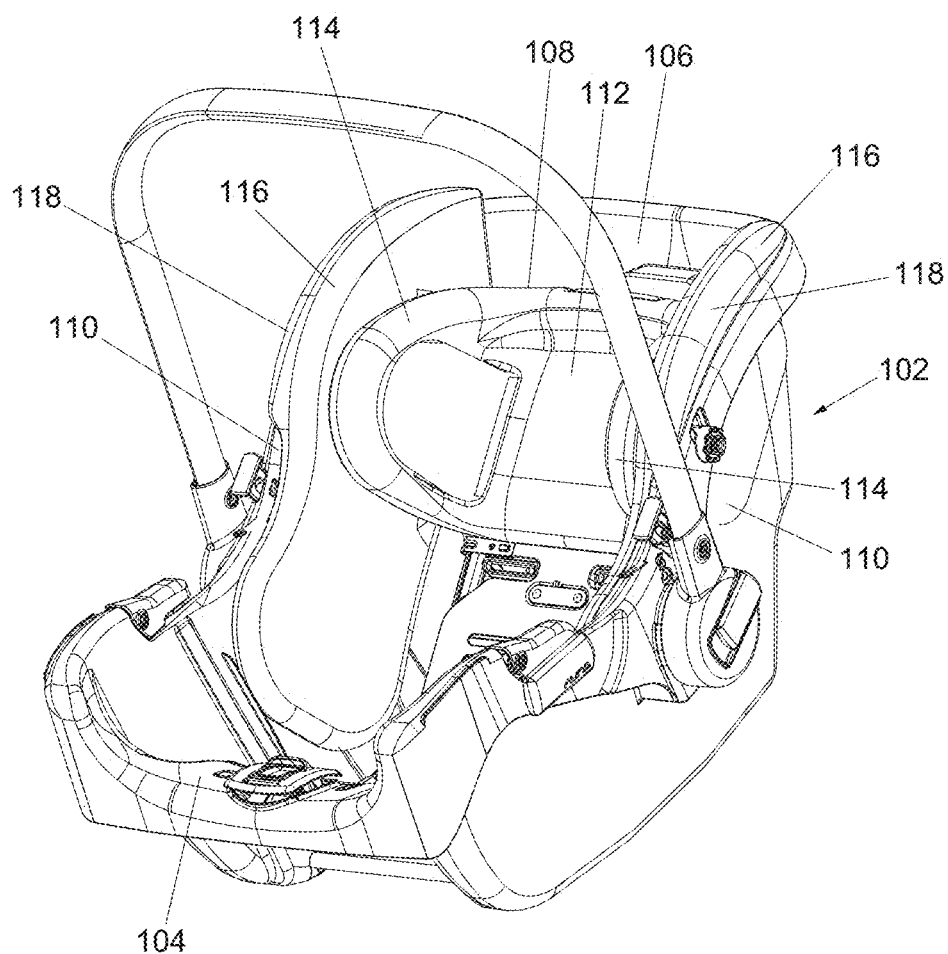
FIG. 1 is a perspective view illustrating an embodiment of a child safety seat.

FIG. 1 is a perspective view illustrating an embodiment of a child safety seat 100. The child safety seat 100 can include a seat shell 102. The seat shell 102 can have a seat portion 104, a backrest portion 106 and two sidewalls 110. The seat shell 102, including the seat portion 104, the backrest portion 106 and the two sidewalls 110, may be formed by plastic materials.

The two sidewalls 110 can protrude forward from the backrest portion 106, and can respectively extend along a left and a right side of the backrest portion 106. The two sidewalls 110 can sideways delimit an inner space of the seat shell 102 adapted to receive a child, and can provide sideways protection for the child's body. The backrest portion 106 can be assembled with an adjustable headrest 108 that is disposed between the two sidewalls 110. The headrest 108 can move along the backrest portion 106 between the two sidewalls 110 for adjustment in accordance with the height of a child placed in the seat shell 102.

According to an embodiment, the headrest 108 can have a central support portion 112, and two side support portions 114 respectively protruding forward at a left and a right side of the central support portion 112. The two side support portions 114 of the headrest 108 can provide sideways protection for the child's head.

The child safety seat 100 can further include two side protection parts 116 that are respectively disposed adjacent to the two sidewalls 110 at an inner side thereof. At each of the left and right side, the side protection part 116 can extend along the inner side of the corresponding sidewall 110 from a location adjacent to the seat portion 104 toward a top of the backrest portion 106, a portion of the side protection part 116 being located between the sidewall 110 and the side support portion 114 of the headrest 108. According to an example of construction, the side protection parts 116 can exemplarily include, without limitation, plastic materials.

Figure 2:
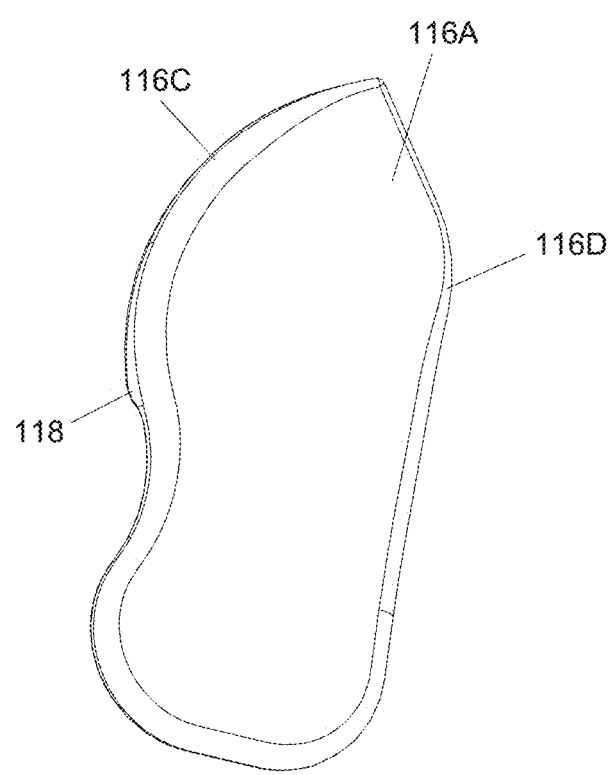
FIG. 2 is a perspective view of a side protection part suitable for use in the child safety seat.
Figure 3:
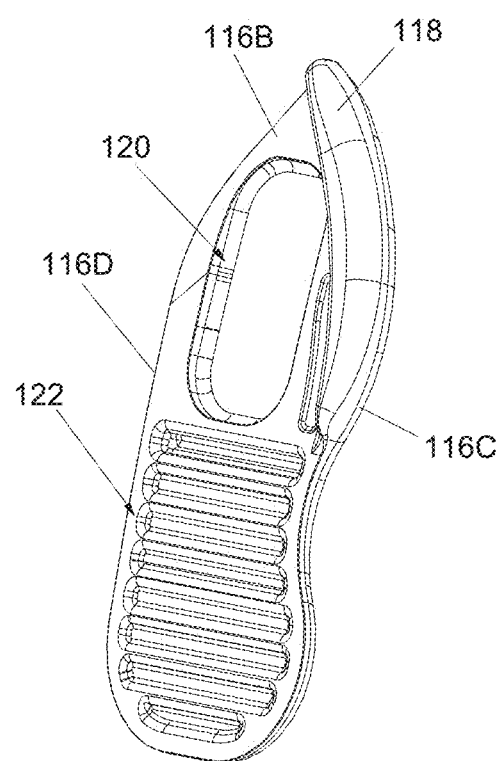
FIG. 3 is another perspective view illustrating the side protection part of FIG. 2.

In conjunction with FIG. 1, FIGS. 2 and 3 are two perspective views respectively illustrating two opposite sides of the side protection part 116. Referring to FIGS. 2 and 3, the side protection part 116 is exemplarily a panel, and has two major surfaces 116A and 116B, and two edge portions 116C and 116D. The two major surfaces 116A and 116B are respectively located on two opposite sides of the side protection part 116. The edge portion 116C can be respectively connected with the two major surfaces 116A and 116B along a side of the side protection part 116, and the edge portion 116D can be respectively connected with the two major surfaces 116A and 116B along another side of the side protection part 116. Moreover, the edge portion 116C may have a rib 118 protruding from the major surface 116B. When the side protection part 116 is installed in the seat shell 102, the major surface 116A faces the inner space of the seat shell 102 and the corresponding side support portion 114 of the headrest 108, the major surface 116B faces and is adjacent to the corresponding sidewall 110, the edge portion 116C faces a front of the seat shell 102, the edge portion 116D lies adjacent to the backrest portion 106, and the rib 118 lies adjacent to a front edge of the corresponding sidewall 110.

The side protection part 116 can have one or more cushioning structure that is configured to provide elastic resilience and is deformable to cushion the impact of sideways collisions. Referring to FIGS. 2 and 3, the major surface 116A of the side protection part 116 is generally planar, and the major surface 116B of the side protection part 116 can have one or more cushioning structure, e.g., a plurality of cushioning structures 120 and 122. According to an example of construction, the cushioning structures 120 and 122 can be formed integrally with the side protection part 116, a material thickness of the cushioning structures 120 and 122 being smaller than a material thickness of the side protection part 116 in regions thereof other than the cushioning structures 120 and 122. The cushioning structures 120 and 122 can thereby provide elastic resilience, and are deformable to cushion the impact of sideways collisions. According to an example of construction, the cushioning structures 120 and 122 may include one or more sunken region, which can have a bottom material thickness that is smaller than the material thickness of the side protection part 116 in regions thereof other than the cushioning structures 120 and 122. When the side protection part 116 is subjected to a sideways collision, the side protection part 116 can deform and dissipate a portion of the collision energy, thereby providing effective cushioning against sideways collision impacts.

The position of the cushioning structure 120 can generally correspond to the headrest 108, which can provide cushioning for the headrest 108 during sideways collision. More specifically, the side support portion 114 of the headrest 108 may substantially overlap with a surface area of the cushioning structure 120, and the side support portion 114 and the cushioning structure 120 can remain overlapping each other within a range of vertical adjustment of the headrest 108. According to an example of construction, the cushioning structure 120 can have a surface area that is at least equal to a surface area of the side support portion 114, preferably slightly greater than the surface area of the side support portion 114.

The cushioning structure 120 can include one or multiple sunken region. A sunken region refers to a recess that is formed on the major surface 116B so that the cushioning structure 120 is distinctly visible on the major surface 116B. In the example illustrated in FIG. 3, the cushioning structure 120 is formed as a single sunken region on the major surface 116B of the side protection part 116, which can have a surface area substantially overlapping with the side support portion 114 of the headrest 108. According to another example of construction, the cushioning structure 120 can include multiple sunken regions formed on the major surface 116B that occupy an area substantially overlapping with the side support portion 114 of the headrest 108.

According to yet another embodiment, the cushioning structure 120 may be formed as a hollow portion of the side protection part 116 having one or more inner cavities between the two major surfaces 116A and 116B. In this case, the cushioning structure 120 may not be visible on any of the major surfaces 116A and 116B. In an example where the cushioning structure 120 is a hollow portion having a single inner cavity, the single inner cavity can have a surface area substantially overlapping with the side support portion 114 of the headrest 108. In another example where the cushioning structure 120 is a hollow portion having a plurality of inner cavities, the inner cavities can occupy an area inside the side protection part 116 that substantially overlaps with the side support portion 114 of the headrest 108.

The cushioning structure 122 can be located below the cushioning structure 120, i.e., corresponding to a portion of the backrest portion 106 below the headrest 108. The cushioning structure 122 can be formed as one or more sunken region (i.e., formed on the major surface 116B) or a hollow portion (i.e., having one or more inner cavity formed between the two major surfaces 116A and 116B). According to an example of construction, the cushioning structure 122 can include a plurality of elongate sunken regions parallel to one another, as shown in FIG. 3.

According to an example of construction shown in FIG. 3, the cushioning structure 120 is formed as a single sunken region, and the cushioning structure 122 located below the cushioning structure 120 includes a plurality of elongate sunken regions parallel to one another, the cushioning structure 122 having a surface area greater than the surface area of the cushioning structure 120. By configuring the cushioning structures 120 and 122 with different structural features and/or different sizes, the elasticity of the side protection part 116 can differ in the regions of the cushioning structures 120 and 122.

Advantages of the child safety seat described herein include the ability to provide effective cushioning against sideways collision. More specifically, the child safety seat includes side protection parts having cushioning structures that provide better elastic resilience and are adapted to at least partially dissipate the impact energy generated by sideways collisions. As a result, the child safety seat can offer better protection.

Realization of the child safety seat has been described in the context of particular embodiments. These embodiments are meant to be illustrative and not limiting. Many variations, modifications, additions, and improvements are possible. These and other variations, modifications, additions, and improvements may fall within the scope of the inventions as defined in the claims that follow.

What is claimed is:

1. A child safety seat comprising:
   a seat shell having a seat portion, a backrest portion and a sidewall, the sidewall protruding forward from the backrest portion and having a front edge facing forward of the seat shell; and
   a side protection part disposed adjacent to the sidewall at an inner side thereof, the side protection part extending along the inner side of the sidewall from a location adjacent to the seat portion toward a top of the backrest portion;
   wherein the side protection part has a first and a second major surface opposite to each other, and an edge portion connected with the first and second major surface, the edge portion having a rib that protrudes from the second major surface and lies adjacent to the front edge of the sidewall of the seat shell, the rib extending forward of the front edge from the inner side of the sidewall toward an outer side of the sidewall.

2. The child safety seat according to claim 1, wherein the rib covers at least partially the front edge of the sidewall of the seat shell.

3. The child safety seat according to claim 1, further comprising a headrest connected with the backrest portion and movable along the backrest portion, the headrest having a side support portion protruding forward, the side protection part having a portion extending between the sidewall of the seat shell and the side support portion of the headrest.

4. The child safety seat according to claim 3, wherein the first major surface faces an inner space of the seat shell and the side support portion of the headrest, and the second major surface faces and is adjacent to the sidewall of the seat shell.

5. The child safety seat according to claim 3, wherein the side protection part includes a first cushioning structure and a second cushioning structure, the first cushioning structure being positioned to generally correspond to the headrest, and the second cushioning structure being located below the first cushioning structure, the first cushioning structure and the second cushioning structure being configured so that an elasticity of the side protection part differs in regions corresponding to the first cushioning structure and the second cushioning structure.

6. The child safety seat according to claim 5, wherein the first cushioning structure is formed as a single sunken region having a surface area substantially overlapping with the side support portion of the headrest.

7. The child safety seat according to claim 5, wherein the second cushioning structure includes a plurality of elongate sunken regions parallel to one another.

8. The child safety seat according to claim 5, wherein the first cushioning structure is formed as a single sunken region, and the second cushioning structure includes a plurality of elongate sunken regions parallel to one another.

9. The child safety seat according to claim 5, wherein any of the first and second cushioning structure is formed as a hollow portion of the side protection part having one or more inner cavities between the first and second major surface.

10. The child safety seat according to claim 5, wherein the second cushioning structure occupies a surface area greater than that of the first cushioning structure.

11. The child safety seat according to claim 1, wherein the second major surface of the side protection part faces the sidewall of the seat shell and is provided with one or more cushioning structure.

12. The child safety seat according to claim 11, wherein the one or more cushioning structure is formed integrally with the side protection part, a material thickness of the one or more cushioning structure being smaller than a material thickness of the side protection part in regions thereof other than the one or more cushioning structure.

13. The child safety seat according to claim 12, wherein the one or more cushioning structure includes a sunken region.

14. The child safety seat according to claim 1, wherein the side protection part has a hollow portion between the first and second major surface forming a cushioning structure.

15. The child safety seat according to claim 1, wherein the side protection part is a panel disposed adjacent to the sidewall of the seat shell.

16. A child safety seat comprising:
a seat shell having a seat portion, a backrest portion and a sidewall, the sidewall protruding forward from the backrest portion and having a front edge facing forward of the seat shell; and
a side protection part disposed adjacent to the sidewall at an inner side thereof, the side protection part extending along the inner side of the sidewall from a location adjacent to the seat portion toward a top of the backrest portion;
wherein the side protection part has one or more cushioning structure, and a first and a second major surface opposite to each other, the first major surface facing an inner space of the seat shell where is received a child and covering the one or more cushioning structure, and the second major surface facing the sidewall of the seat shell; and
wherein the side protection part has an edge portion connected with the first and second major surfaces, the edge portion having a rib that protrudes from the second major surface and lies adjacent to the front edge of the sidewall of the seat shell, the rib extending forward of the front edge from the inner side of the sidewall toward an outer side of the sidewall.

17. The child safety seat according to claim 16, wherein the one or more cushioning structure includes a sunken region formed on the second major surface, or a hollow portion between the first and second major surface.

18. The child safety seat according to claim 16, further comprising a headrest connected with the backrest portion and movable along the backrest portion, the headrest having a side support portion protruding forward, the side protection part having a portion extending between the sidewall of the seat shell and the side support portion of the headrest.

19. The child safety seat according to claim 18, wherein the one or more cushioning structure includes a first cushioning structure and a second cushioning structure, the first cushioning structure being positioned to generally correspond to the headrest, and the second cushioning structure being located below the first cushioning structure, the first cushioning structure and the second cushioning structure being configured so that an elasticity of the side protection part differs in regions corresponding to the first cushioning structure and the second cushioning structure.

* * * * *